Aug. 17, 1954     H. STAMM     2,686,436
LOCKING DEVICE WITH SPRINGLESS PAWL
Filed June 16, 1950
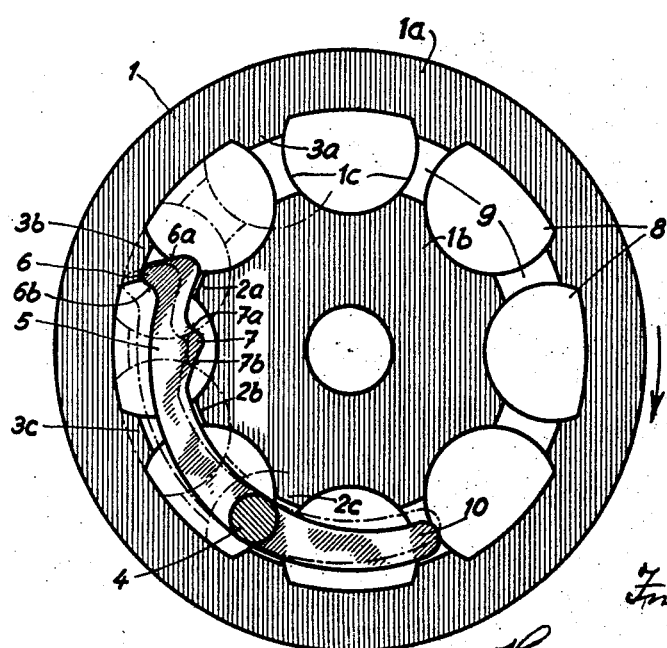

Patented Aug. 17, 1954

2,686,436

UNITED STATES PATENT OFFICE

2,686,436

LOCKING DEVICE WITH SPRINGLESS PAWL

Heinrich Stamm, Grenchen, Switzerland, assignor to Eterna S. A., Grenchen, Switzerland, a corporation of Switzerland Application June 16, 1950, Serial No. 168,433

1 Claim. (Cl. 74—577)

This invention relates to timepieces and more especially to locking devices with a springless pawl for the clockwork of watches and other timepieces.

The locking device according to this invention comprises a wheel having two concentric sets of stops disposed at equal angular distances and an oscillating pawl mounted in the space between these two sets of stops, said pawl being mounted for rotation independently of the wheel and having lugs cooperating with two sets of stops and alternatively penetrating between said stops when the wheel is rotated in one direction.

The pawl may be formed as a lever with one or two arms and in this latter case a lug is provided on each lever arm. The stops may be staggered but it is also possible that the lugs are staggered.

The invention will now be described by way of example with reference to the accompanying drawing which shows diagrammatically by way of example an embodiment of the invention as viewed from above.

As shown in the drawing, the locking device consists of a wheel with hub portions and felly portions and of a pawl arranged for coaction with said wheel.

The wheel 1 is formed as a disc in which firstly a circular row of regularly arranged apertures 8 have been stamped, the remaining part of the disc, after these apertures have been stamped, thus being composed of a felly portion 1a, a hub 1b and spokes 1c.

An annular recess 9 is then countersunk between the apertures 8, through the middle part of the spokes which thus are composed each of three parts, an external part, as designated by 3a, 3b, 3c, an internal part, as designated by 2a, 2b, 2c and a middle part, thinner than the two others. There are thus formed an outer set of stops or projections 3a, 3b, 3c . . . and an inner set of stops or projections 2a, 2b, 2c . . . In the annular recess 9 is arranged the pivot 4, mounted independently of the wheel 1, and about this pivot turns the pawl comprising an active arm 5 and an inactive arm 10. The outer lug is designated by 6, its locking surface by 6a and its inclined surface by 6b, the inner locking lug, which is staggered with respect to the lug 6, is designated by 7, its locking surface by 7a and its inclined surface by 7b. The device permits of a rotation of the wheel 1 with respect to the pivot 4 in the direction of the arrow, while preventing rotation in the reverse direction.

If the wheel 1 is rotated from the position shown in solid lines in the direction of the arrow the flank of the projection 2b presses on the inclined surface 7b. During this rotation the lug 6 has left the projection 3b so that the lever arm 5, under the influence of the torque produced by the pressure of the projection 2b on the inclined surface 7b, is rotated about its pivot 4 and reaches the position shown in dot and dash lines. If the wheel 1 is further rotated the projection 3c engages the inclined surface 6b so that the pawl returns to its initial position, for the lug 7 can penetrate into the gap between the projections 2b and 2c. A rotation of the wheel 1 can therefore take place without obstacle in the direction of the arrow.

If now the wheel is to be rotated from the position shown in solid lines in the direction opposite to that of the arrow, the projection 2a bears against the locking surface 7a and the wheel 1 turns until the lug 6 leaves the projection 3b and penetrates between the two projections 3a and 3b. The wheel 1 continues to turn counterclockwise until the projection 3a engages the locking surface 6a and exerts on the pawl a counter-clockwise torque. However, the pawl cannot respond thereto because the lug 6 meets on the inner wall of the gap between the projections 3a and 3b. The locking position is thus reached and a continuation of the rotation of the wheel 1 in the counter-clockwise direction is impossible. The locking effect takes place before the wheel has moved through an angle of rotation corresponding to half of the division separating two adjacent projections.

It would be possible to provide only one lug on the lever 5 and to arrange the other lug on the lever 10 which would thus also become an active lever arm.

The invention thus provides a locking device with a single springless pawl, by means of which it is possible with an absolute security to prevent the rotation of the wheel in one direction.

I claim:

In a locking device, a disc having a felly portion, a hub portion and spokes, extending between said felly portion and said hub portion, said spokes having an external part, an internal part and a middle part thinner than the rest of said disk thereby forming, on one side of said disc, an annular path concentric to the disc, a pivot independent of said disc being disposed at a distance from the axis of said disc substantially equal to the radius of said annular path, a pawl pivoted on said pivot and extending within said path and being formed with an internal nose, an external nose and a locking face, said noses being arranged to alternately coact with said external and internal parts, respectively, of said spokes to rock said pawl alternatingly outwards and inwards when said disc rotates in one direction with respect to said pawl and for rocking said pawl outwards so as to place said locking face in the path of an external part of said spokes and locking said disc, when the disc rotates in the other direction.

References Cited in the file of this patent

UNITED STATES PATENTS

| Number | Name | Date |
|---|---|---|
| 259,527 | Gibsen | June 13, 1882 |
| 684,482 | Walters | Oct. 15, 1901 |
| 1,148,402 | Prahl | July 27, 1915 |
| 2,482,435 | Poole | Sept. 20, 1949 |

FOREIGN PATENTS

| Number | Country | Date |
|---|---|---|
| 993,792 | France | Nov. 7, 1951 |

OTHER REFERENCES

Scientific American, Supplement No. 1536, June 10, 1905.